US012664862B2

(12) United States Patent
Connelly et al.

(10) Patent No.: US 12,664,862 B2
(45) Date of Patent: Jun. 23, 2026

(54) ELECTRONIC TABLE GAME WITH SIDE BETS AND ADJUSTABLE PLAY SPEED

(71) Applicant: Interblock d.o.o., Menges (SI)

(72) Inventors: John Joseph Connelly, Las Vegas, NV (US); Jeffrey Kowalchuk, Las Vegas, NV (US)

(73) Assignee: INTERBLOCK D.O.O., Las Vegas, NV (US)

( * ) Notice: Subject to any disclaimer, the term of this patent is extended or adjusted under 35 U.S.C. 154(b) by 180 days.

(21) Appl. No.: 18/532,612

(22) Filed: Dec. 7, 2023

(65) Prior Publication Data

US 2024/0404371 A1 Dec. 5, 2024

Related U.S. Application Data

(60) Provisional application No. 63/506,312, filed on Jun. 5, 2023.

(51) Int. Cl.
*G07F 17/32* (2006.01)
*G06F 3/04817* (2022.01)

(52) U.S. Cl.
CPC ...... *G07F 17/3293* (2013.01); *G06F 3/04817* (2013.01); *G07F 17/3211* (2013.01); *G07F 17/3269* (2013.01)

(58) Field of Classification Search
None
See application file for complete search history.

(56) References Cited

U.S. PATENT DOCUMENTS

| | | | |
|---|---|---|---|
| 8,727,892 B1 | 5/2014 | Chun | |
| 10,322,333 B1 | 6/2019 | Reeves et al. | |

| | | | | |
|---|---|---|---|---|
| 2013/0196777 A1 | 8/2013 | Hill | | |
| 2014/0094256 A1* | 4/2014 | Hilbert | ................... | G07F 17/34 |
| | | | | 463/20 |
| 2016/0089594 A1 | 3/2016 | Yee | | |
| 2017/0301179 A1 | 10/2017 | Palenzuela | | |
| 2022/0335772 A1* | 10/2022 | Goldberg | ........... | G07F 17/3239 |
| 2025/0118147 A1* | 4/2025 | Connelly | ................ | A63F 1/067 |

FOREIGN PATENT DOCUMENTS

| | | |
|---|---|---|
| CN | 105848740 A | 8/2016 |
| TW | M642226 U | 6/2023 |

OTHER PUBLICATIONS

International Patent Application No. PCT/US2024/029005; Int'l Search Report and the Written Opinion; dated Aug. 16, 2024; 13 pages.
International Patent Application No. PCT/US2024/029005; Int'l Preliminary Report on Patentability; dated Aug. 28, 2025; 24 pages.

* cited by examiner

*Primary Examiner* — Ronald Laneau
(74) *Attorney, Agent, or Firm* — BakerHostetler

(57) ABSTRACT

The present disclosure relates to systems and methods for live gaming and video stream switching. Various embodiments may receive a wagering selection to initiate a first wager amount on a first round of a blackjack gaming event. A graphical user interface may provide a virtual play area and a plurality of side bet icons associated with the blackjack gaming event. A decision cycle time may be set for a duration of the gaming event. The decision cycle time defines a time window for making a gaming decision during a round of the blackjack gaming event. In some examples, a second decision cycle time may be set to define a time window for making bets between rounds of the blackjack gaming event.

21 Claims, 6 Drawing Sheets

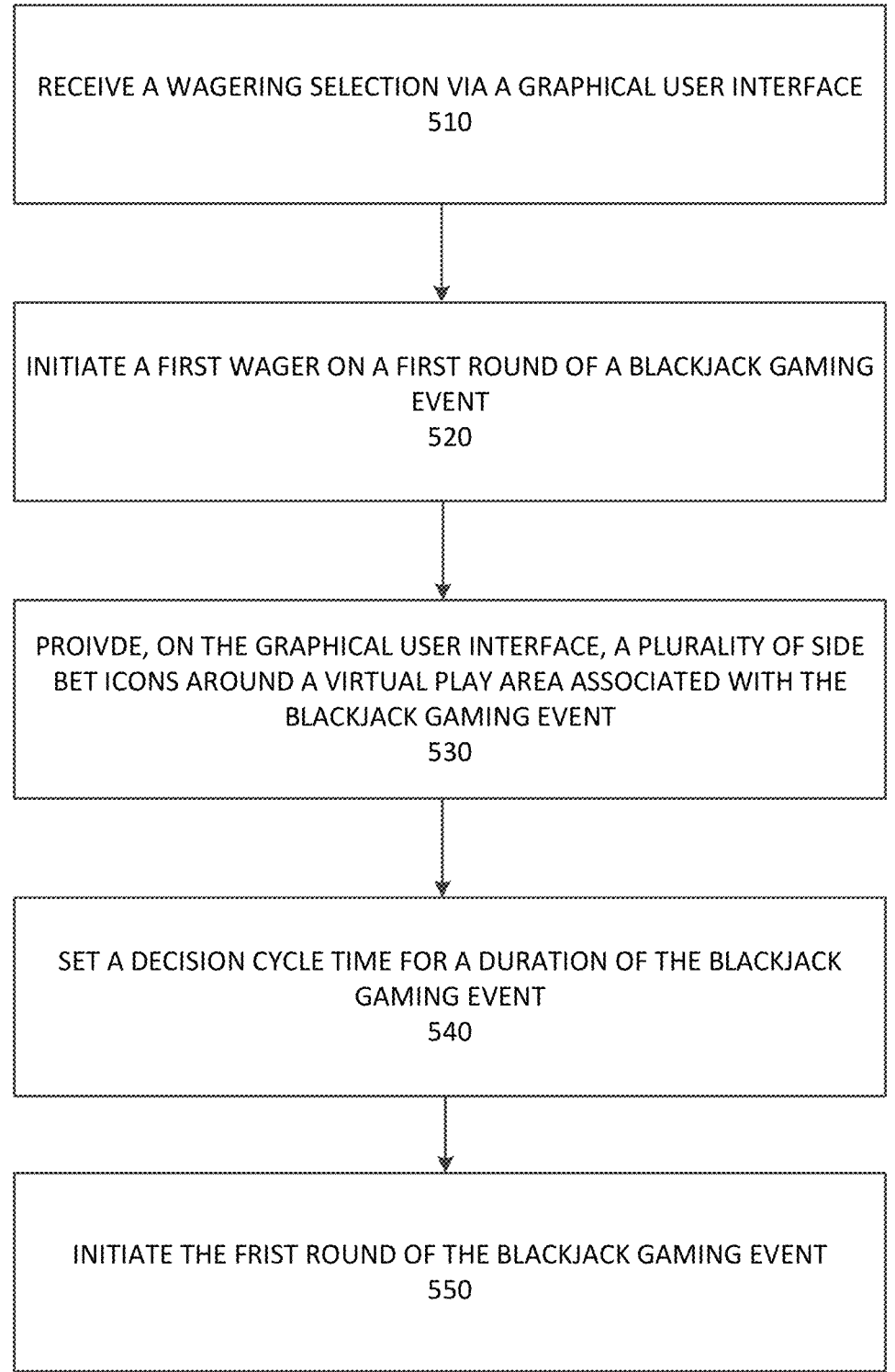

RECEIVE A WAGERING SELECTION VIA A GRAPHICAL USER INTERFACE
510

INITIATE A FIRST WAGER ON A FIRST ROUND OF A BLACKJACK GAMING EVENT
520

PROIVDE, ON THE GRAPHICAL USER INTERFACE, A PLURALITY OF SIDE BET ICONS AROUND A VIRTUAL PLAY AREA ASSOCIATED WITH THE BLACKJACK GAMING EVENT
530

SET A DECISION CYCLE TIME FOR A DURATION OF THE BLACKJACK GAMING EVENT
540

INITIATE THE FRIST ROUND OF THE BLACKJACK GAMING EVENT
550

FIG. 5

ELECTRONIC TABLE GAME WITH SIDE BETS AND ADJUSTABLE PLAY SPEED

CROSS REFERENCE TO RELATED APPLICATIONS

This application claims benefit under 35 U.S.C. § 119(e) of Provisional U.S. Patent Application No. 63/506,312, filed Jun. 5, 2023, the contents of which is incorporated herein by reference in its entirety.

TECHNICAL FIELD

The present disclosure relates generally, but not exclusively, to the field of gaming, particularly electronic blackjack gaming.

BACKGROUND INFORMATION

Blackjack, also known as Twenty-One, is a card game that has been played for many decades by recreational players and gamblers. Blackjack is a mainstay at casinos all over the United States and the world. Generally, at casinos, blackjack is played according to a set of standardized rules. These standardized rules include rules regarding the play of the cards and rules regarding how the players may place wagers. In recent years, video blackjack has become popular. Video blackjack (also referred to as electronic blackjack) is played on stand-alone gaming devices or on client devices, such as computers or the like, which communicate with servers over a network or the internet. Typically, video blackjack is played by individuals against the house (also referred to as the "dealer), and the dealing of the cards from virtual decks and shoes is controlled by one or more computers.

In such electronic games, the pace of play is often preset and defined in advance by the computer or gaming system operating the game. For example, a betting window, a card draw rate, graphics, visualizations, and other gaming animations may take a predetermined amount of time. The allotted time for certain actions, like gaming decisions, may be timed to the average player or the general population.

Advanced players and regular players familiar with the electronic game may desire a faster pace of play. These players may, for example, be more familiar with different types of bets and be able to make betting decisions significantly faster than a new or intermittent gamer. A faster play rate may result in players playing more games per given time period, and more games can translate into greater profits for the house.

SUMMARY

Systems and methods for wagering on an electronic gaming apparatus are discussed herein. Such embodiments may include operations to receive, via a graphical user interface (GUI), a wagering selection to initiate a first wager amount on a first round of a blackjack gaming event, provide, on the GUI, a plurality of side bet icons around a virtual play area associated with the blackjack gaming event, wherein each side bet icon is individually selectable, and wherein a selection of a first side bet icon initiates a second wagering selection for a second wager amount, set a decision cycle time for a duration of the blackjack gaming event, wherein the decision cycle time defines a time window for making a gaming decision during a round of the blackjack gaming event, and wherein the decision cycle time is adjustable by player input at the GUI prior to a start of the blackjack gaming event, and initiate the first round of the blackjack gaming event.

These and other features will be more clearly understood from the following detailed description taken in conjunction with the accompanying drawings and claims. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 5 is a flowchart for wagering operations, in accordance with an embodiment.

DETAILED DESCRIPTION OF EMBODIMENTS

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Disclosed herein are methods, systems, and computer readable storage media that provide wagering systems and methods for electronic blackjack gaming. Various embodiments enable a variety of side bet options on a graphical user interface. A decision cycle time may also be set for the duration of a blackjack gaming event. The decision cycle time may define a time window for making bets, side bets, deciding how to play a hand (e.g., hit, stand, double, etc.) and making other gaming decisions related to the blackjack gaming event.

Advanced players and regular players may be familiar with the betting options, the pace of play, and other gameplay operations. The decision cycle time limits the time to make gameplay decisions and may increase the pace of play, the rate of play, and player excitement and satisfaction. Faster gameplay can result in more games played per given period of time and may result in profit and other financial benefits for the casino or gaming location.

Figure 1:
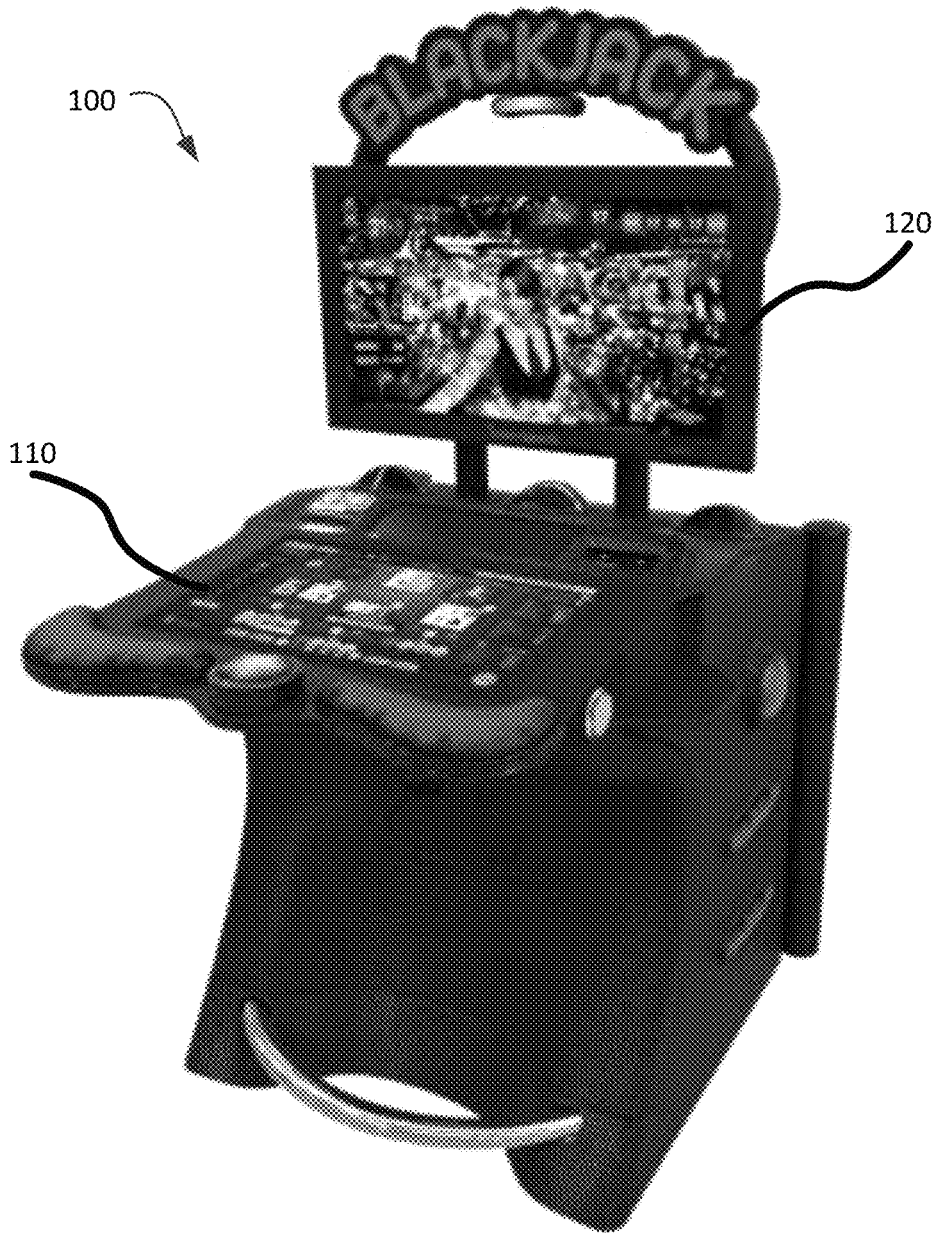
FIG. 1 is an example electronic blackjack gaming system in accordance with an embodiment.

FIG. 1 illustrates an example blackjack gaming system 100. Such gaming systems may be an individual play station, such as an electronic table game, providing blackjack and, optionally, other casino games. The gaming system 100 may include a display 120 and player controls 110 through which bets and other blackjack gaming operations may be implemented. The display 120 may provide a graphical user interface, as discussed herein, that provides blackjack hands, betting options, payout information, event information, player history, player account information, and any of a plurality of gaming information. In some examples, the display 120 may be a touchscreen, on which users may select various gaming operations. The player controls may include one or more buttons to make selections provided on display 120.

Although FIG. 1 illustrates a single play station, one skilled in the art will recognize that blackjack gaming systems may include a singly play station or any number of play stations. For example, the live gaming system may include one play station, two play stations, ten play stations, and so on. In an embodiment, the gaming system 100 may not include any play stations. For example, live gaming system 100 may be servicing one or more remote clients or user devices not physically proximate to the gaming system 100. In an embodiment, the blackjack gaming system 100 may be servicing a combination of local play stations and remote play stations. And, while a blackjack gaming machine is illustrated, any type of electronic gaming machine may be utilized, including universal cabinets, providing other games, and gaming systems, such as slots, dice systems, e.g., for craps or sic bo, and card systems, e.g., for poker, blackjack, baccarat, pai gow poker, etc.

According to various embodiments, blackjack games are composed of a betting window associated with a game cycle. The game cycle may be a round of blackjack, and the betting window includes a bet open time and a bet close time. The bet open time represents a point in time in which the betting window transitions from a closed state to an open state. After the bet open time, the betting window is in the open state and a player is allowed to place one or more bets or wagers on the associated game cycle. In an embodiment, the player is allowed to place one or more side bets or wagers on at least one additional game of chance when the betting window is in the open state.

The bet close time represents a point in time in which the betting window transitions from an open state to a closed state. After the bet close time, the betting window is in the closed state and the player is no longer allowed to place bets or wagers on the associated game cycle. In an embodiment, the bet close time precedes a time that a card is drawn. In an embodiment, the bet close time is adjustable based on a decision cycle time, as discussed herein.

In operation, the electronic gaming machines, including blackjack machines 110, utilize one or more random number generators to control various mechanical aspects of the game play, including card draws. The one or more random number generators are used to increase a randomization of events composing the games. Increasing the randomization of events composing the games reduces a likelihood that game cycle results are predictable. For example, random number generators may dictate a card draw, or a timing of various events composing the live blackjack games, and the like.

Central display 120 is configured to present players and other guests of the casino or other gaming establishment with information associated with the live blackjack games operated by the gaming system 100. Such information may be presented in a visual format, an auditory format, or a combination thereof. The information presented by central display 120 may include information regarding individual results of previous game cycles, a state of a current betting window associated with the gaming system 100, statistics about previous games cycles, an operating condition of the gaming system 100, a progressive jackpot associated with gaming system and/or blackjack gaming events, and the like. In an embodiment, central display 120 is further configured to present players and other guests of the casino or other gaming establishment with advertising media.

Figure 2:
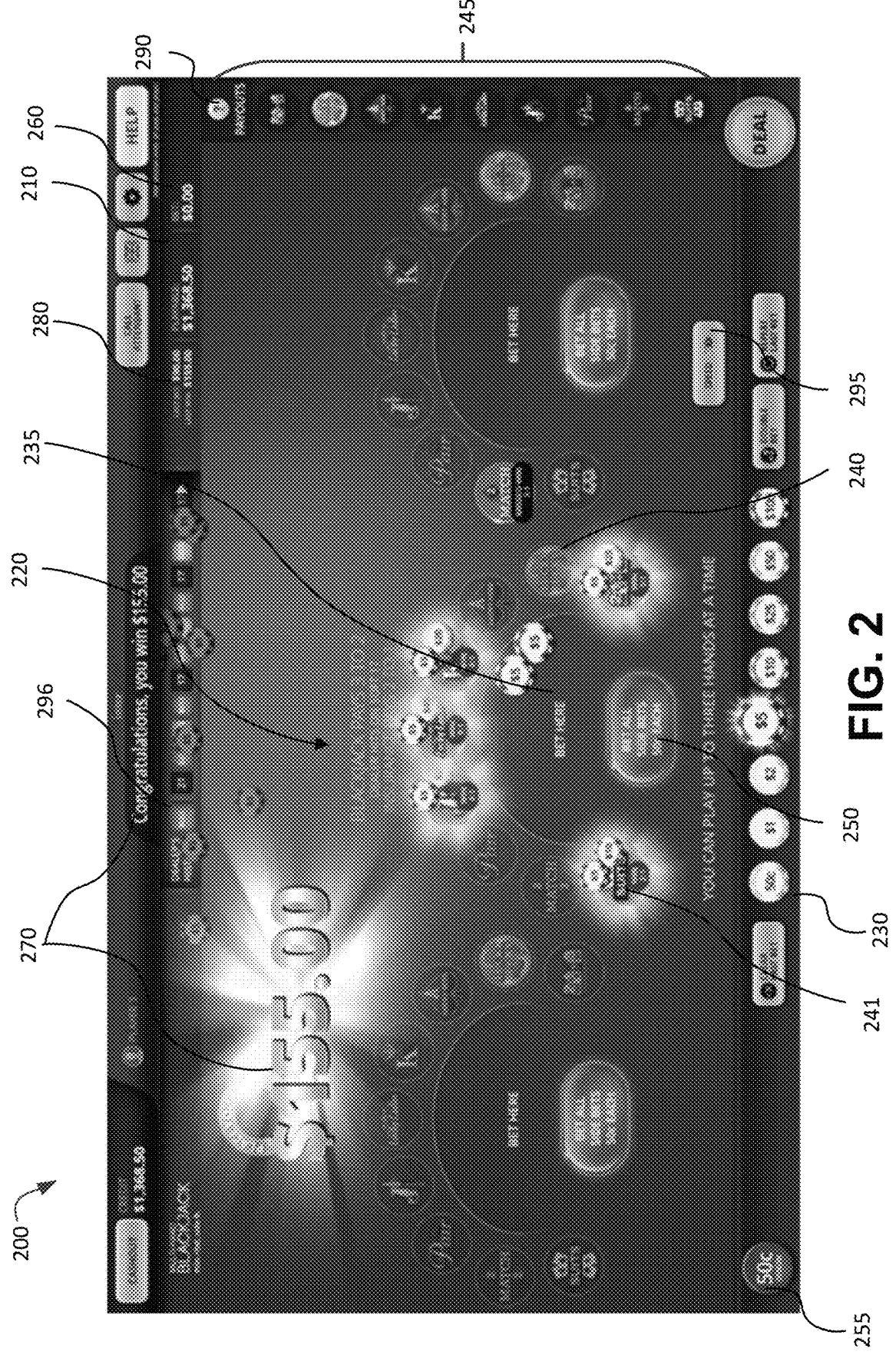
FIG. 2 illustrates an example graphical user interface ("GUI") displayed by a blackjack gaming system, in accordance with an embodiment.

As best seen in FIG. 2, a play station may present a graphical user interface ("GUI") 200 that enables a player to participate in the live blackjack games operated by gaming system 100. For example, GUI 200 may display account information 210 to a player that represents a maximum credit balance that is available to the player for wagering on the live blackjack games. In an embodiment, a player may insert currency, tickets, tokens, and the like into gaming system 100 in order to increase the maximum credit balance. In an embodiment, a player may electronically transfer funds from another account using the gaming system 100 in order to increase the maximum credit balance.

GUI 200 may also display an electronic representation of a felt betting area 220 (or layout) for live blackjack games operated by gaming system 100 or some other electronic representation for any other type of game. The player may wager on one or more hands of blackjack. As shown in FIG. 2, it is possible to play three hands at once, although each hand is bet separately. A player may place a wager on a hand of a regular live blackjack game (where the player gets two cards, the dealer gets two cards, and each tries to get as close to 21 by staying or hitting per the regular rules of the game) by placing one or more virtual chips 230 onto a first virtual play area 220. For example, the player may place virtual chips 230 onto a betting area 235 of virtual play area 220. Once virtual chips 230 have been placed in betting area 235, the player may also play one or more side bet areas, the icons 240 which surround the betting area 235, by placing virtual chips 230 on the one or more side bet icons 240.

The number and type of side bets made available to a player may vary. As illustrated in FIG. 2, a regular blackjack game has just been completed during which the player also made a number of side bets. Side bet 241 is indicated to be a winner, paying odds of 2-1. Side bet 241 is a "SUITS" side bet where the object of the side bet is to bet on the first two cards dealt to the player being of a matching suit. If the suits are different, the side bet is lost. This type of side bet does not affect the basic strategy of the blackjack game. The player may learn about how each side bet works by selecting a corresponding icon from the menu 245.

The player may also select a bet all button 250 to place a bet on all of the side bet icons 240. The denomination of the virtual chip 230 to be placed on each side bet icon 240 when the bet all button is selected is based on the minimum bet button 255 established for the blackjack game. The minimum bet 255 may be pre-established when the gaming system 100 is installed such that the minimum bet button 255 is deactivated. Alternatively, the minimum bet may be selectable by the player, such by pressing the minimum bet button 255 to enter a different minimum bet, so long as the amount of the minimum bet entered by the player is a higher than the amount of the pre-established minimum bet. In some examples, when players play multiple hands, different side bets may be placed on each hand.

A wagering update area 260 of GUI 200 may also present information regarding an amount currently wagered by the player on the live blackjack games operated by gaming system 100. Information regarding the last amount bet and the last amount won may be presented in recent history area 280. Information regarding payout amounts won by the player through previous bets may also be presented to the player through the menu 245 by selecting a payouts button 290. In an embodiment, wagering update area 260 may also present the player with information regarding an aggregate amount wagered and/or won in a current session. In an embodiment, a banner may also present the player with information regarding an aggregate amount wagered and/or won within a predetermined period of time (e.g., hour, day, month, year, lifetime, etc.).

GUI 200 may also present a status update area 295 that provides the player with information about a current game cycle of the live blackjack games operated by gaming system 100. For example, status update area 295 may inform the player that a betting window associated with the current game cycle is in an open state. The betting window is in the open state between a bet open time and a bet close time. As long as the betting window remains in the open state, the player is free to wager on the current game cycle of the live blackjack games. The betting window associated with the current game cycle transitions from the open state to a closed state when the bet close time is reached. Status update area 295 may inform the player that a betting window associated with the current game cycle is in the closed state. As illustrated in FIG. 2, the status update area 295 is illustrated by a button that says "SPEED" followed by three arrows, each indicating a period of time. Two of the arrows are filled in and one is not, which may either indicate that two periods of time have passed already and one remains, or the opposite in which one period of time has passed already and two remain, during which the betting window associated with the current game cycle stays open.

A historical dealer's hand data area 296 of GUI 200 may provide the player with information about the dealer's results from previous game cycles of the live blackjack games. For example, historical data area 296 may display a sequence of individual results for the dealer from previous game cycles. As illustrated in FIG. 2, the most recent dealer's hands was a bust, followed by 21, bust, bust, bust, 17, bust, bust, bust, 17, bust, etc. An arrow can be selected to see more historical information. As another example, historical data area 296 may display statistical information about the previous game cycles. The statistical information may include a percentage of a predetermined number of previous game cycles, and the like. In some examples the historical information may be hidden, e.g., on a side banner, and additional information may be provided when the historical information area is opened.

Figure 3:
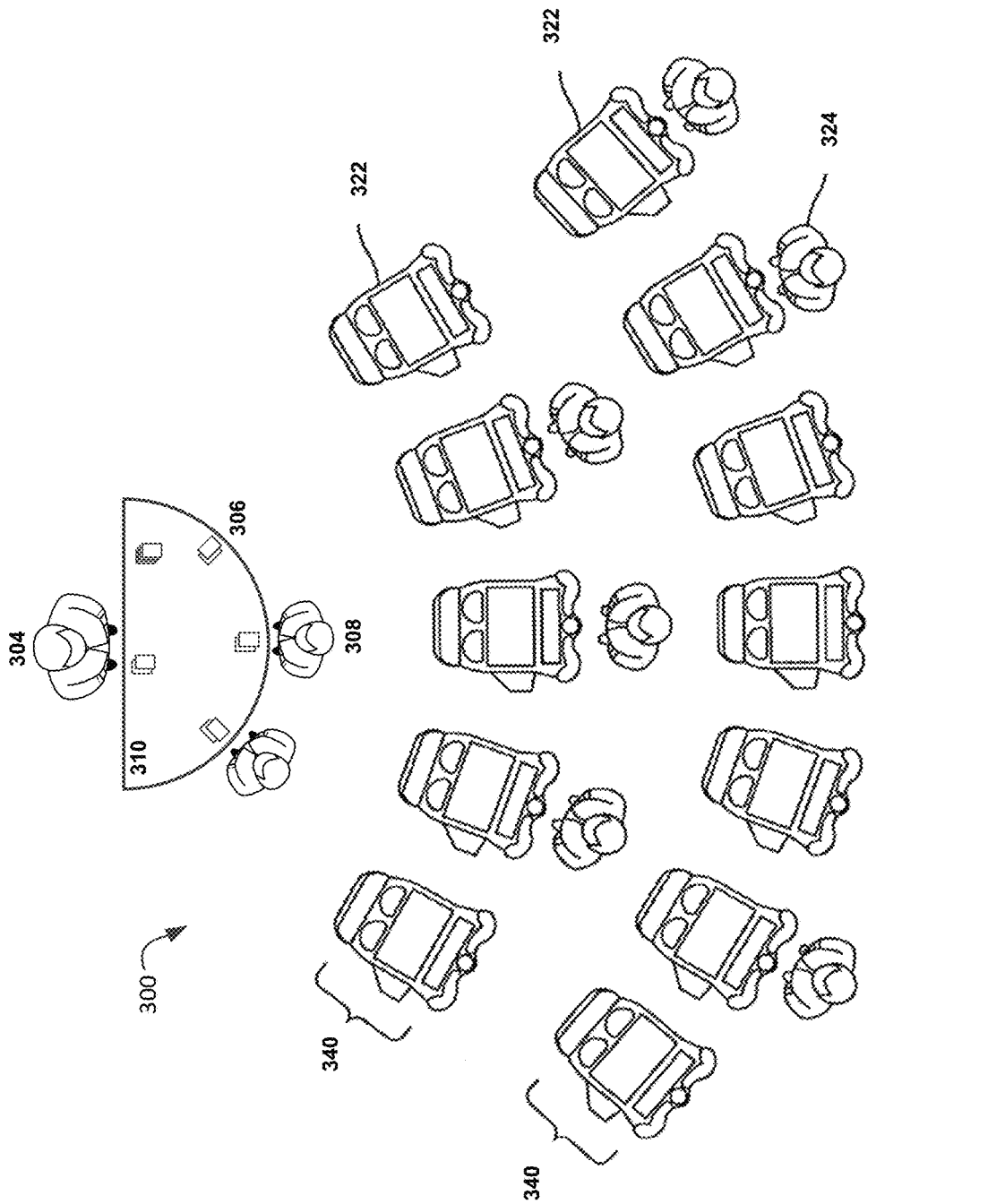
FIG. 3 is a diagrammatic, top view of gaming in a stadium configuration, in accordance with an embodiment.

FIG. 3 illustrates a live table gaming set up in a stadium configuration. While live gaming table 310 illustrates a blackjack table, the live gaming table may provide a platform for a variety of betting and casino games, including but not limited to craps, roulette, blackjack, as well as a variety of slot machines that may be played live, i.e., physically played in a physical environment while play is controlled remotely by a player. The live table game may be incorporated with one or more play stations 340, and/or with any of the gaming system examples discussed herein regarding FIGS. 1 and 2. The gaming area 300 may include any or all of the live gaming table 310 and the play stations 340. Live video of the gaming table 310 be streamed to a player device, such as a remote player device (e.g., smart phone, tablet, computer, etc.) or play station 340. In some examples, input at the player device and/or play station may adjust the view of the table 310, for example, causing a closer view or zoomed in view, an area of the table (e.g., player positions 306), another object within the gaming area 300, or adjusting the fields of view.

In one example, the live gaming table 310 is a typical blackjack table on which a layout is displayed, and on which cards may be drawn by a dealer 304. The dealer 304 may be positioned at an end of the table opposite the live players 308. According to various embodiments, the gameplay occurring on the table 302 may be reflected on a play station 340 or player device. A screen 322 of a play station or player device may reflect gameplay and/or results from the live game happening on table 310. A player 324 may interact with the gaming station 340 or player device, and place bets based on the live gameplay or otherwise provide control input.

In some examples, a player 324 at a play station 340 may bet on one or more hands dealt at gaming table 310. This may enable more games to be played at a given table, without necessarily increasing a number of dealers 304, or extending a length of time the dealer 304 works at gaming table 310. An open position 306 may be provided at the gaming table 310. The open position may or may not be played by a live player. In some examples, the hand at the open position is playable at one or more play stations 340.

In some examples, the screen 322 or player device is an interactive touch screen and may provide one or more gaming displays. The gaming displays may be associated with the live gaming table 310. The screen 322 or player device may also provide gaming information separate from the live gameplay at table 310.

In other examples, the game may include a live dealer 304 with an electronic table game in a pit. Similar to the layout illustrated in FIG. 3, a live event may occur in a gaming area (e.g., table 310), visible to those playing at a play station. As discussed herein, events occurring in the gaming area may be bet on, viewed, or otherwise interacted with at the individual play stations. In some cases, the live event may be a live dealer, a card draw, a dice throw, a roulette spin, or other betting event occurring in real time.

According to various examples, players may place bets using a wallet saved on the user device. Funds may be transferred via the wallet to the gaming application or other means to place bets similar to how bets would be made at the play station. In an example a ticket-in ticket-out system may be used to input credits on the play station 340 and then be used to cash out when the player is done playing that machine.

In some examples, one or more peripherals may be connected to the user device to enhance the gaming experience. For example, a button (e.g., "bash button") may be connected to the user device to allow players to initiate certain gaming events by activating the button. Other types of peripherals may be applicable, based on the play station and/or game type. In some examples, the peripheral may be connected through a Universal Serial Bus (USB). In another example, a card reader may be connected to the user device, to enable users to add funds, log in, or access loyalty programs, discounts, free games, and the like.

The gaming experience and gaming interactions at the player device may occur in real time, thus providing a live gaming experience to players. This also allows players who are remote or otherwise unable to play directly on at a play station to play. The remote control of the play station, via any of the techniques discussed herein, enable more players to access the play stations. In addition to improving gaming access, the techniques also provide variety as to how games are played, which may also increase player interest, entertainment, and participation. Such improvements can further benefit the gaming location and its profitability since more players can access the games and play remotely, and the number of unoperated play stations at any given time will likely be reduced.

Figure 4:
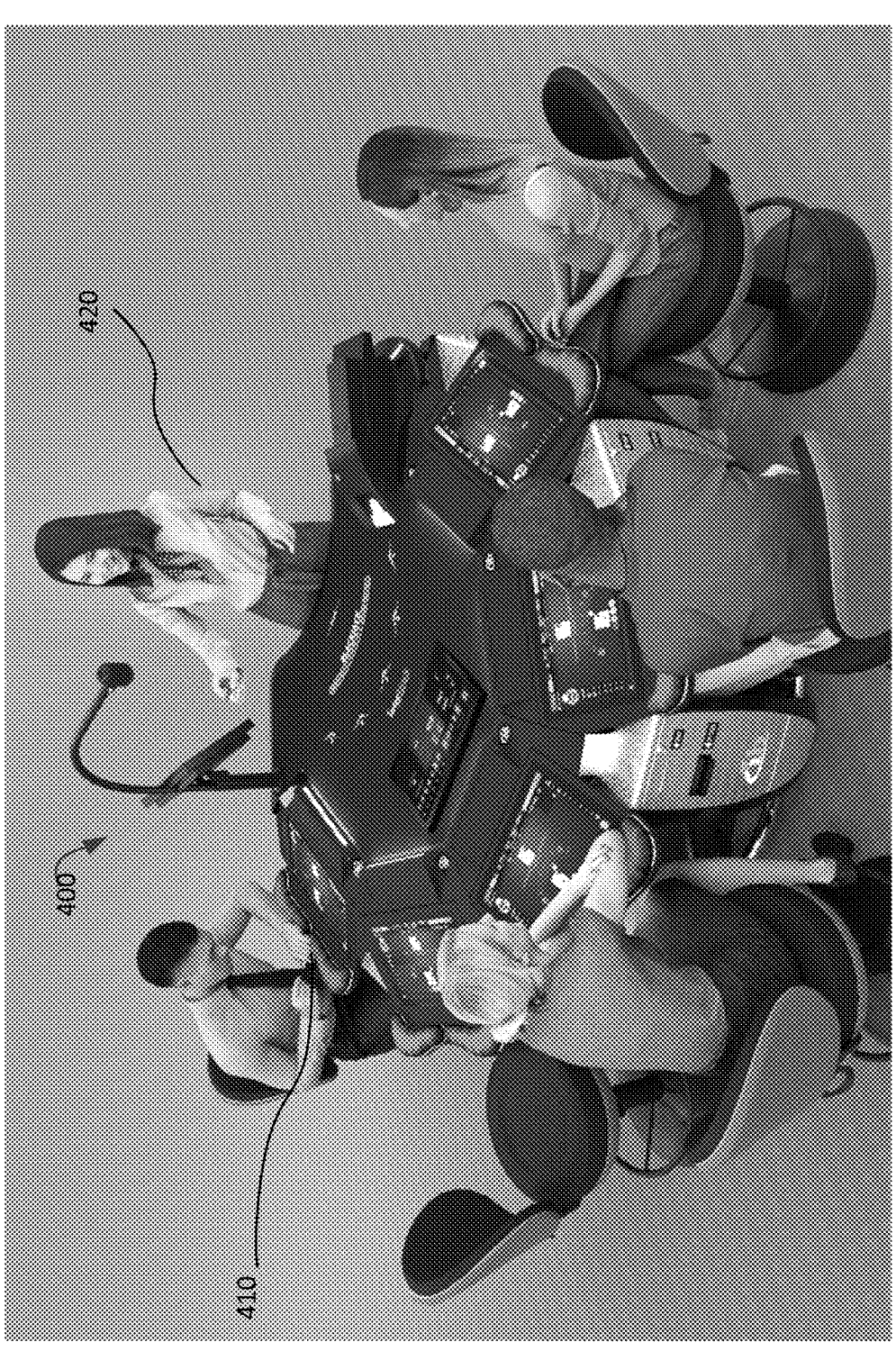
FIG. 4 illustrates a dealer assisted multiplayer gaming system, in accordance with an embodiment.

FIG. 4 provides another example of a blackjack gaming system, as a live electronic table game 400. A plurality of individual play stations 100 may each provide a graphical user interface on which blackjack games may be played. A live dealer 420 may deal cards and assist players in real-time during gaming events. The live dealer may utilize one or more peripherals 440, such as a dealer GUI, a microphone, controller, or other items to manage gameplay. In some examples, the live dealer 420 may control one or more features associated with game play, such as a decision cycle time, a display screen on the player station, and the like.

In various configurations, bets, side bets, and other gaming decisions may be entered by a player 430 at their individual play station 100. The electronic gaming table 400 may include options for players to connect a virtual wallet, link a player account, and/or add physical or virtual currency. Players may be able to customize their gameplay experience, as discussed herein, to play multiple hands, enter side bets, check their account, set a decision cycle time, and the like.

Live ETG arrangements provide the experience of a live blackjack game, with a live dealer and physical cards, while automating one or more aspects of betting and wager resolution. The automation reduces the level of skill required for the dealer to operate the table and ensures more accurate wagers and payouts. This may also result in a faster pace of play, more games played per hour, and greater profits for the casino because the dealer only needs to deal the cards and pick up the cards at the end of a round instead of also managing the chips at the table. Such arrangements may further attract players who are familiar with the blackjack interface on the play station, and players of all levels who would like a live gaming experience. The interface allows an individualized group experience, which is unique to traditional live blackjack table games, and virtual blackjack games.

FIG. 5 provides a flowchart of a live gaming operation, in accordance with various aspects. Such operations may occur using one or more computing devices, including a processor and memory. Various techniques may utilize one or more cameras, user devices (e.g., cell phone, smartphone, PC, gaming device, etc.), play stations (e.g., an electronic table game), or applications operating on a user device or other computing device. In some examples, a user device may include a downloadable application, which provides access to the camera and play station(s) and manages one or more operations described herein. In some examples, the application may communicate with one or more remote computing devices, servers, databases, and computing elements to manage communications and operations between various devices.

At block 510, aspects may receive a wagering selection at a graphical user interface. The graphical user interface may be similar to the examples discussed with respect to FIG. 2. For example, a plurality of betting areas may be provided, wherein each betting area is associated with a separate blackjack hand playable during at least one round of the blackjack gaming event.

The wagering selection may indicate a number of hands to play in a first round (e.g., one, two, three, or more), a wager amount, and the like. In various examples, the wagering selection may update an account balance displayed at the graphical user interface. The wagering selection may be displayed numerically or symbolically (e.g., as virtual chips).

At block 520, aspects may initiate a first wager on a first round of a blackjack gaming event. The first wager may be deducted from a player's virtual wallet and/or deducted from a displayed account balance. If a player is playing multiple hands, the first wager may be applied to any or all hands being played in the first round.

At block 530, aspects may provide, on the graphical user interface, a plurality of side bet icons around a virtual play area associated with the blackjack gaming event. In some examples, as illustrated in FIG. 2, each side bet may have its own icon, and the side bet icons at least partially surround a virtual betting area. If there are multiple betting areas, e.g., when multiple hands are being played, each betting area may provide its own set of side bet icons, representing available side bets to be played for that hand.

Some embodiments may provide a "Bet All" button which, when selected, initiates a wager for all possible side bets for one or more hands being played in the first round. In some examples, the wager for all possible side bets is a lowest available bet value. A selection of any side bet icon may initiate a second wagering selection for a second wager amount.

Side bets may include one or more of: a 21+3 side bet, a top 21+3 side bet, a bust side bet, a C3 side bet, a lucky aces side bet, a lucky ladies side bet, a lucky lucky side bet, a match side bet, an A-2 side bet, a blackjack bonus side bet, a poker 3 side bet, a poker 3 bonus side bet, a KK side bet, a JJ side bet, a QQ side bet, a pairs side bet, a suits side bet, a 19+ side bet, and a 7's side bet.

At block 540, aspects may set a decision cycle time for a duration of the blackjack gaming event. In various embodiments, the decision cycle time defines a time window for making a gameplay decision during a round of the blackjack gaming event. The gameplay decision may be a player decision on how to play a given hand of blackjack. For example, the decision may be to hit, stand, double, split, etc. In another example, a second decision cycle time may define a time window for making bets between rounds of the blackjack gaming event. Bets, side bets, wagers, and other gameplay changes must be completed within the given time window.

In some examples, one or both decision cycle times may be adjustable by player input at the graphical user interface. In some embodiments, one or both decision cycle times are adjustable prior to a start of the blackjack gaming event. In another example, one or both decision cycle times may be adjustable after the first round of the blackjack gaming event.

In another example, aspects may further include starting the time window of the decision cycle time upon completion of the first round and setting a wager amount for the second round of the blackjack gaming event after the time window expires. The wager amount for the second round may correspond to a wagering selection received during the time window. The wager amount for the second round may also correspond to a default wager when the wagering selection is not received during the time window. For example, the default wager may be an amount equal to the first wager amount. In other examples, the default wager amount may be more or less than the first wager amount.

In various embodiments, the overall time window of the decision cycle time is less than five seconds, less than ten seconds, less than thirty seconds, or less than sixty seconds. In embodiments, the decision cycle time may be divided into different periods of time based on the overall time window. The wagering selection associated with one or more side bets may be 50 cents, $1, $2, $5, $10, $25, $50, $100. In embodiments, the minimum wagering selection for all of the side bets when the bet all button is selected is pre-established. In embodiments, the player may increase the minimum wagering selection from the pre-established amount to a higher amount.

At block 550, aspects may initiate the first round of the blackjack gaming event. As discussed herein, the blackjack gaming event may occur virtually, live, or both. A live dealer may manage one or more aspects of the blackjack gaming event, such as dealing cards. Bets, side bets, and other gaming decisions may occur virtually, on a graphical user interface of a gaming system such as an individual play station. Wagers may be resolved in a similar manner.

Each of the blocks of FIG. 5 may be reversed as further discussed herein, such that an ordering of one or more aspects, such as setting side bet options and setting a decision cycle time may be reversed and/or occur at different times.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Figure 6:
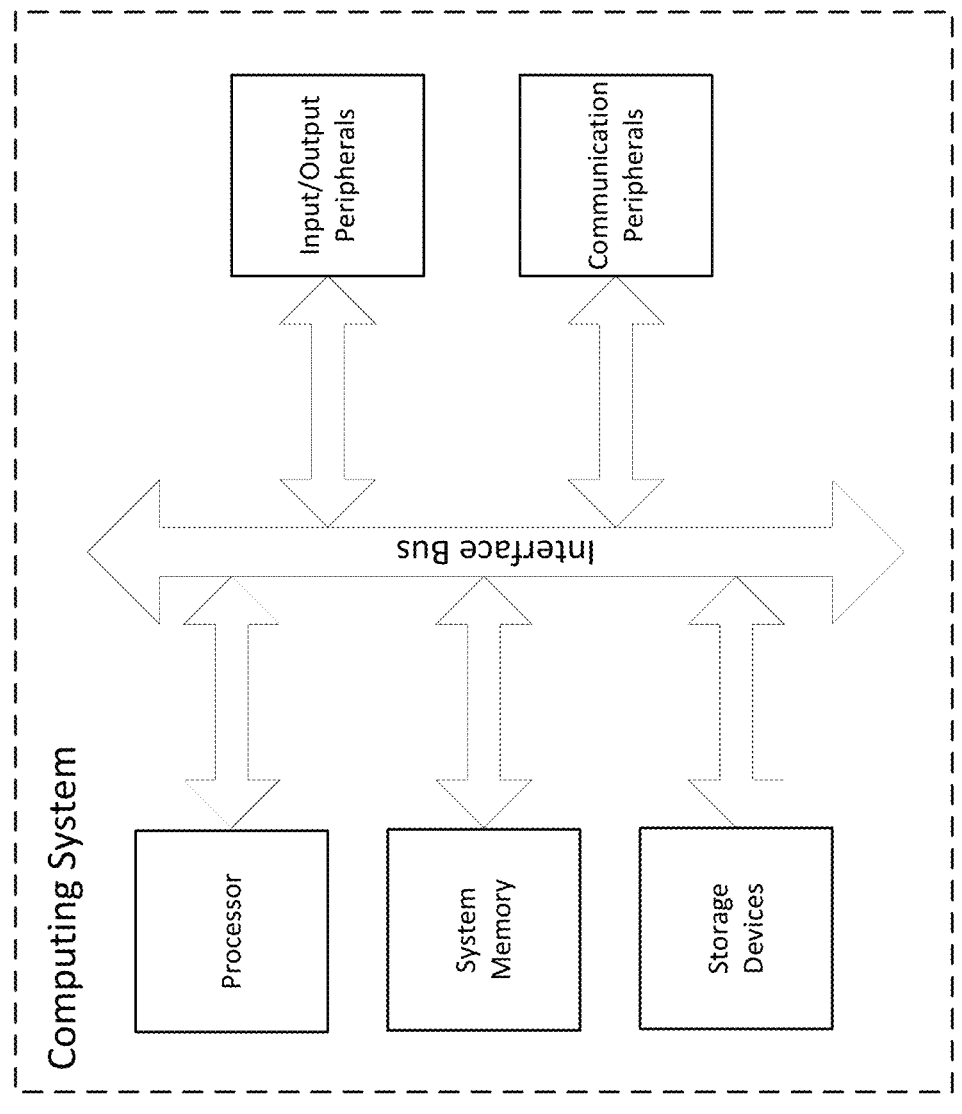
FIG. 6 is an illustration of an exemplary block diagram representing a general-purpose computer system in which aspects of the methods and systems disclosed herein or portions thereof may be incorporated.

The techniques described above can be implemented on a computing device associated with a gaming device (e.g., a roulette machine operating a live roulette game), a plurality of computing devices associated with a plurality of gaming devices, a controller in communication with the gaming device(s) (e.g., a controller configured to synchronize the gaming devices(s)), or a plurality of controllers in communication with the gaming device(s). Additionally, the techniques may be distributed between the computing device(s) and the controller(s). FIG. 6 illustrates an exemplary block diagram of a computing system that includes hardware modules, software module, and a combination thereof and that can be implemented as the computing device and/or as the server.

In a basic configuration, the computing system may include at least a processor, a system memory, a storage device, input/output peripherals, communication peripherals, and an interface bus. Instructions stored in the memory may be executed by the processor to perform a variety of methods and operations, including the roulette wheel velocity adjustments and result detection optimization, as described above. The computing system components may be present in the gaming device, in a server or other component of a network, or distributed between some combinations of such devices.

The interface bus is configured to communicate, transmit, and transfer data, controls, and commands between the various components of the electronic device. The system memory and the storage device comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory comprises an operation system and applications. The processor is configured to execute the stored instructions and can comprise, for example, a logical processing unit, a microprocessor, a digital signal processor, and the like.

The system memory and the storage device may also comprise computer readable signal media. A computer readable signal medium may include a propagated data signal with computer readable program code embodied therein. Such a propagated signal may take any of variety of forms including, but not limited to, electro-magnetic, optical, or any combination thereof. A computer readable signal medium may be any computer readable medium that is not a computer readable storage medium and that can communicate, propagate, or transport a program for use in connection with the computing system.

Further, the input and output peripherals include user interfaces such as a keyboard, screen, microphone, speaker, other input/output devices, and computing components such as digital-to-analog and analog-to-digital converters, graphical processing units, serial ports, parallel ports, and universal serial bus. The input/output peripherals may also include a variety of sensors, such as light, proximity, GPS, magnetic field, altitude, and velocity/acceleration. RSSI, and distance sensors, as well as other types of sensors. The input/output peripherals may be connected to the processor through any of the ports coupled to the interface bus.

The user interfaces can be configured to allow a user of the computing system to interact with the computing system. For example, the computing system may include instructions that, when executed, cause the computing system to generate a user interface and conduct other methods and operations that the user can use to provide input to the computing system and to receive an output from the computing system.

This user interface may be in the form of a graphical user interface that is rendered at the screen and that is coupled with audio transmitted on the speaker and microphone and input received at the keyboard. In an embodiment, the user interface can be locally generated at the computing system. In another embodiment, the user interface may be hosted on a remote computing system and rendered at the computing system. For example, the server may generate the user interface and may transmit information related thereto to the computing device that, in turn, renders the user interface to the user. The computing device may, for example, execute a browser or an application that exposes an application program interface (API) at the server to access the user interface hosted on the server.

Finally, the communication peripherals of the computing system are configured to facilitate communication between the computing system and other computing systems (e.g., between the computing device and the server) over a communications network. The communication peripherals include, for example, a network interface controller, modem, various modulators/demodulators and encoders/decoders, wireless and wired interface cards, antenna, and the like.

The communication network includes a network of any type that is suitable for providing communications between the computing device and the server and may comprise a combination of discrete networks which may use different technologies. For example, the communications network includes a cellular network, a Wi-Fi/broadband network, a local area network (LAN), a wide area network (WAN), a telephony network, a fiber-optic network, or combinations thereof. In an example embodiment, the communication network includes the Internet and any networks adapted to communicate with the Internet. The communications network may be also configured as a means for transmitting data between the computing device and the server.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile, or non-volatile storage.

An embodiment for wagering on an electronic gaming apparatus, the method comprising: receiving, via a graphical user interface (GUI), a wagering selection to initiate a first wager amount on a first round of a blackjack gaming event; providing, on the GUI, a plurality of side bet icons around a virtual play area associated with the blackjack gaming event, wherein each side bet icon is individually selectable, and wherein a selection of a first side bet icon initiates a second wagering selection for a second wager amount on the first side bet icon; setting a decision cycle time for a duration of the blackjack gaming event, wherein the decision cycle time defines a time window for making a gaming decision during a round of the blackjack gaming event, and wherein the decision cycle time is adjustable by player input at the GUI prior to a start of the blackjack gaming event; and initiating the first round of the blackjack gaming event.

In an embodiment, further comprising providing, on the GUI, an icon, which when selected, initiates a wager for all side bets for the first round.

In an embodiment, wherein the wager is a lowest available bet value.

In an embodiment, further comprising providing, on the GUI, a plurality of betting areas, wherein each betting area is associated with a separate blackjack hand playable during at least one round of the blackjack gaming event.

In an embodiment, wherein the plurality of betting areas is three betting areas.

In an embodiment, further comprising: starting the time window of the decision cycle time upon completion of the first round; and setting a wager amount for the second round of the blackjack gaming event after the time window expires, wherein the wager amount for the second round corresponds to a wagering selection received during the time window, and wherein the wager amount for the second round corresponds to a default wager when the wagering selection is not received during the time window.

In an embodiment, wherein the default wager amount is equal to the first wager amount.

In an embodiment, further comprising after the first round of the blackjack gaming event, adjusting the decision cycle time.

In an embodiment, further comprising setting a second decision cycle time, the second decision cycle time defining a time window for making bets between rounds of the blackjack gaming event.

In an embodiment, wherein the gaming decision is at least one of hitting, standing, doubling, and splitting a hand of blackjack.

In an embodiment, an electronic gaming system, comprising: a player station comprising a graphical user interface; a processor; and a memory storing instructions, which when executed by the processor, cause the processor to: receive, via the graphical user interface (GUI), a wagering selection to initiate a first wager amount on a first round of a blackjack gaming event; provide, on the GUI, a plurality of side bet icons around a virtual play area associated with the blackjack gaming event, wherein each side bet icon is individually selectable, and wherein a selection of a first side bet icon initiates a second wagering selection for a second wager amount on the first side bet icon; set a decision cycle time for a duration of the blackjack gaming event, wherein the decision cycle time defines a time window for making a gaming decision during a round of the blackjack gaming event, and wherein the decision cycle time is adjustable by player input at the GUI prior to a start of the blackjack gaming event; and initiate the first round of the blackjack gaming event.

In an embodiment, wherein the gaming decision is at least one of hitting, standing, doubling, and splitting a hand of blackjack.

In an embodiment, wherein the side bets include one or more of: a 21+3 side bet, a top 21+3 side bet, a bust side bet, a C3 side bet, a lucky aces side bet, a lucky ladies side bet, a lucky lucky side bet, a match side bet, an A-2 side bet, a blackjack bonus side bet, a poker 3 side bet, a poker 3 bonus side bet, a KK side bet, a JJ side bet, a QQ side bet, a pairs side bet, a suits side bet, a 19+ side bet, and a 7's side bet.

In an embodiment, wherein the window of the decision cycle time is less than five seconds, less than ten seconds, less than thirty seconds, or less than sixty seconds.

In an embodiment, wherein the wagering selection is 50 cents, $1, $2, $5, $10, $25, $50, $100.

In an embodiment, further comprising a peripheral configured to receive player input.

In an embodiment, wherein the blackjack gaming event reflects cards drawn by a live dealer.

In an embodiment, further comprising instructions to set a second decision cycle time, the second decision cycle time defining a time window for making bets between rounds of the blackjack gaming event.

In an embodiment, comprising a non-transitory computer-readable storage medium comprising instructions stored thereon that cause a computing device to at least: receive, via a graphical user interface (GUI), a wagering selection to initiate a first wager amount on a first round of a blackjack gaming event; provide, on the GUI, a plurality of side bet icons around a virtual play area associated with the blackjack gaming event, wherein each side bet icon is individually selectable, and wherein a selection of a first side bet icon initiates a second wagering selection for a second wager amount on the first side bet icon; set a decision cycle time for a duration of the blackjack gaming event, wherein the decision cycle time defines a time window making a gaming decision during a round of the blackjack gaming event, and wherein the decision cycle time is adjustable by player input at the GUI prior to a start of the blackjack gaming event; and initiate the first round of the blackjack gaming event.

In an embodiment, wherein the gaming decision relates to playing a hand of blackjack.

As previously noted, the various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all the elements in the list.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

The terms and descriptions used above are set forth by way of illustration only and are not meant as limitations. Those skilled in the art will recognize that those and many other variations, enhancements and modifications of the concepts described herein are possible without departing from the underlying principles of the invention. The scope of the invention should therefore be determined only by the following claims and their equivalents.

What is claimed is:

1. A method for wagering on an electronic gaming apparatus, the method comprising:
  receiving, via a graphical user interface (GUI), a wagering selection to initiate a first wager amount on a first round of a blackjack gaming event;
  providing, on the GUI, for a first player, a plurality of betting areas, each betting area corresponding to a different blackjack hand playable by the first player during the first round;
  providing, on the GUI, a plurality of side bet icons positioned around a virtual play area associated with each of the plurality of betting areas, wherein each side bet icon is individually selectable by the first player, and wherein a selection of a first side bet icon, for an associated betting area, initiates a second wagering selection for a second wager amount on the first side bet icon for that betting area;
  setting a decision cycle time for a duration of the blackjack gaming event, wherein the decision cycle time defines a time window for making a gaming decision during a round of the blackjack gaming event, and wherein the decision cycle time is adjustable by player input at the GUI prior to a start of the blackjack gaming event; and
  initiating the first round of the blackjack gaming event.

2. The method of claim 1, further comprising: providing, on the GUI, an icon, which when selected, initiates a wager for all side bets for the first round.

3. The method of claim 2, wherein the wager is a lowest available bet value.

4. The method of claim 3, wherein the lowest available bet value may be adjusted by player input to a higher value.

5. The method of claim 1, further comprising:
  providing, on the GUI, a plurality of betting areas, wherein each betting area is associated with a separate blackjack hand playable during at least one round of the blackjack gaming event.

6. The method of claim 5, wherein the plurality of betting areas is three betting areas.

7. The method of claim 1, further comprising:
  starting the time window of the decision cycle time upon completion of the first round; and
  setting a wager amount for the second round of the blackjack gaming event after the time window expires,
  wherein the wager amount for the second round corresponds to a wagering selection received during the time window, and
  wherein the wager amount for the second round corresponds to a default wager when the wagering selection is not received during the time window.

8. The method of claim 7, wherein the default wager amount is equal to the first wager amount.

9. The method of claim 1, further comprising:
  after the first round of the blackjack gaming event, adjusting the decision cycle time.

10. The method of claim 1, further comprising setting a second decision cycle time, the second decision cycle time defining a time window for making bets between rounds of the blackjack gaming event.

11. The method of claim 1, wherein the gaming decision is at least one of hitting, standing, doubling, and splitting a hand of blackjack.

12. An electronic gaming system, comprising:
  a live gaming table upon which a dealer may deal and collect cards;

a player station comprising a graphical user interface and coupled to the live gaming table;

a processor; and a memory storing instructions, which when executed by the processor, cause the processor to:

receive, via the graphical user interface (GUI), a wagering selection to initiate a first wager amount on a first round of a blackjack gaming event;

provide, on the GUI, for a first player, a plurality of betting areas, each betting area corresponding to a different blackjack hand playable by the first player during the first round;

provide, on the GUI, a plurality of side bet icons positioned around a virtual play area associated with each of the plurality of betting areas, wherein each side bet icon is individually selectable by the first player, and wherein a selection of a first side bet icon, for an associated betting area, initiates a second wagering selection for a second wager amount on the first side bet icon for that betting area;

set a decision cycle time for a duration of the blackjack gaming event, wherein the decision cycle time defines a time window for making a gaming decision during a round of the blackjack gaming event, and wherein the decision cycle time is adjustable by player input at the GUI prior to a start of the blackjack gaming event; and initiate the first round of the blackjack gaming event based on the decision cycle and when the dealer deals cards on live gaming table.

13. The blackjack gaming system of claim 12, wherein the gaming decision is at least one of hitting, standing, doubling, and splitting a hand of blackjack.

14. The blackjack gaming system of claim 12, wherein the side bets include one or more of: a 21+3 side bet, a top 21+3 side bet, a bust side bet, a C3 side bet, a lucky aces side bet, a lucky ladies side bet, a lucky lucky side bet, a match side bet, an A-2 side bet, a blackjack bonus side bet, a poker 3 side bet, a poker 3 bonus side bet, a KK side bet, a JJ side bet, a QQ side bet, a pairs side bet, a suits side bet, a 19+ side bet, and a 7's side bet.

15. The blackjack gaming system of claim 12, wherein the window of the decision cycle time is one or more of less than five seconds, less than ten seconds, less than thirty seconds, and less than sixty seconds.

16. The blackjack gaming system of claim 12, wherein the wagering selection is one or more of 50 cents, $1, $2, $5, $10, $25, $50, and $100.

17. The blackjack gaming system of claim 12, further comprising a peripheral configured to receive player input.

18. The blackjack gaming system of claim 12, wherein the blackjack gaming event reflects cards drawn by a live dealer.

19. The blackjack gaming system of claim 12, further comprising instructions to set a second decision cycle time, the second decision cycle time defining a time window for making bets between rounds of the blackjack gaming event.

20. A non-transitory computer-readable storage medium comprising instructions stored thereon that cause a computing device to at least:

receive, via a graphical user interface (GUI), a wagering selection to initiate a first wager amount on a first round of a blackjack gaming event;

provide, on the GUI, for a first player, a plurality of betting areas, each betting area corresponding to a different blackjack hand playable by the first player during the first round;

provide, on the GUI, a plurality of side bet icons positioned around a virtual play area associated with each of the plurality of betting areas, wherein each side bet icon is individually selectable by the first player, and wherein a selection of a first side bet icon, for an associated betting area, initiates a second wagering selection for a second wager amount on the first side bet icon, for that betting area;

set a decision cycle time for a duration of the blackjack gaming event, wherein the decision cycle time defines a time window for making a gaming decision during a round of the blackjack gaming event, and wherein the decision cycle time is adjustable by player input at the GUI prior to a start of the blackjack gaming event; and initiate the first round of the blackjack gaming event.

21. The non-transitory computer-readable storage medium of claim 20, wherein the gaming decision relates to playing a hand of blackjack.

* * * * *